(12) United States Patent
Lee et al.

(10) Patent No.: US 9,072,057 B2
(45) Date of Patent: Jun. 30, 2015

(54) METHOD AND APPARATUS FOR TRANSMITTING AND RECEIVING SIGNAL

(71) Applicant: Industry-Academic Cooperation Foundation, Yonsei University, Seoul (KR)

(72) Inventors: Chung Yong Lee, Seoul (KR); Mi Sun Yoon, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 164 days.

(21) Appl. No.: 13/889,246

(22) Filed: May 7, 2013

(65) Prior Publication Data

US 2014/0003366 A1    Jan. 2, 2014

(30) Foreign Application Priority Data

Jun. 29, 2012    (KR) ........................ 10-2012-0071278

(51) Int. Cl.
*H04W 4/00* (2009.01)
*H04W 52/24* (2009.01)
*H04B 17/336* (2015.01)

(52) U.S. Cl.
CPC ............ *H04W 52/24* (2013.01); *H04W 52/245* (2013.01); *H04B 17/336* (2015.01)

(58) Field of Classification Search
CPC ... H04W 52/24; H04W 52/245; H04B 17/336
USPC ........ 370/328, 329; 455/127.2, 63.1, 39, 500, 455/504, 522; 375/259, 285
See application file for complete search history.

(56) References Cited

U.S. PATENT DOCUMENTS

| 7,129,888 | B1 |    | 10/2006 | Chesley |           |
|-----------|----|----|---------|---------|-----------|
| 8,195,112 | B1 | *  | 6/2012  | Zhang et al. | 455/127.2 |
| 8,848,774 | B2 | *  | 9/2014  | Zhong et al. | 375/232 |
| 2008/0310484 | A1 | * | 12/2008 | Shattil | 375/146 |
| 2010/0046598 | A1 | * | 2/2010  | Zhong et al. | 375/233 |
| 2013/0329840 | A1 | * | 12/2013 | Lomp | 375/348 |

FOREIGN PATENT DOCUMENTS

| KR | 10-2006-0028364 A | 3/2006 |
|----|-------------------|--------|
| KR | 10-2009-0100177 A | 9/2009 |

* cited by examiner

*Primary Examiner* — Chuong T Ho

(57) ABSTRACT

Provided are a method and an apparatus for transmitting a signal suitable for an indoor environment. The method for transmitting a signal according to an exemplary embodiment of the present invention includes: preprocessing a signal using a signal power to sidelobe power ratio (SSR) parameter defining a signal to sidelobe ratio to minimize an inter-symbol interference and prevent performance deterioration due to reduction in signal strength; and transmitting the preprocessed signal to a receiving apparatus through a predetermined channel.

20 Claims, 4 Drawing Sheets

METHOD AND APPARATUS FOR TRANSMITTING AND RECEIVING SIGNAL

CROSS-REFERENCE TO RELATED APPLICATIONS

This application claims priority to and the benefit of Korean Patent Application No. 10-2012-0071278 filed in the Korean Intellectual Property Office on Jun. 29, 2012, the entire contents of which are incorporated herein by reference.

TECHNICAL FIELD

The present invention relates to a method and an apparatus for transmitting and receiving a signal suitable for an indoor environment. More particularly, the present invention relates to a method and apparatus for transmitting and receiving a signal for supporting high speed data communication without performance degradation even in a channel having frequency selective characteristics by minimizing inter-symbol interference (ISI).

BACKGROUND ART

Since a signal is transmitted through a channel having frequency selective characteristics in an indoor environment, a delayed and received symbol serves as interference with a subsequent symbol. The related art has used a code division multiple access scheme to solve inter-symbol interference (ISI), but has a problem in that a receiving apparatus is complicated. In this case, a mobile communication or Bluetooth receiving apparatus using a wireless terminal has a large volume, so that the mobile communication or Bluetooth receiving apparatus is difficult to be carried and consumes a considerable amount of power, so that the receiving apparatus is difficult to use. Therefore, in order to solve the foregoing problem, researches into a transmitting apparatus and method capable of reducing complexity of the receiving apparatus while being suitable for an indoor environment by controlling the inter-symbol interference well have been conducted.

A time reversal (TR) technique for concentrating signals on a spatial axis in a multimedia communication system in the indoor environment may minimize an interference signal transmitted to other users that are not targeted and a time reversal technique for concentrating signals on a temporal axis may reduce a delay spread of a channel to reduce the ISI. In particular, the time reversal technique for concentrating signals on the spatial axis may be very usefully used as a technique for reducing multi user interference (MUI) in a multi user environment. However, although a transmitting signal to noise ratio is very high, the time reversal technique cannot completely remove the MUI occurring on the spatial axis and the ISI occurring on the temporal axis, thereby causing performance degradation.

A zero-forcing (ZF) technique sets the inter-symbol interference to be 0, so that when a signal to noise ratio is very high, performance is greatly improved. However, since the zero-forcing technique is a filter for the purpose of reducing interference, a magnitude in a main peak of a received signal becomes relatively very small. Therefore, when the ZF technique is exposed to actually used environmental noises, performance may be degraded.

A technique proposed to overcome the disadvantage of the ZF technique and the disadvantage of the time reversal technique is a joint ZF-TR technique.

The joint ZF-TR technique is a filter that sets the interference to be 0 and maximizes the signal to noise ratio. However, referring to solutions actually obtained by the joint ZF-TR technique, the joint ZF-TR technique shows a main peak value higher than that of the ZF technique, but shows a main peak value lower than that of the TR technique that maximizes the signal to noise ratio. Therefore, the performance may be degraded under the situation in which the environment is poor.

SUMMARY OF THE INVENTION

The present invention has been made in an effort to provide a method and an apparatus for maximizing received power of a signal while minimizing inter-symbol interference occurring by a channel having frequency selective characteristics in an indoor environment. The present invention has also been made in an effort to provide a method for setting a problem in maximizing performance of the existing system to design an optimal filter and deriving a solution to solve the problem.

An exemplary embodiment of the present invention provides a method for transmitting a signal, including: preprocessing a signal using a signal power to sidelobe power ratio (SSR) parameter defining a signal to sidelobe ratio to minimize an inter-symbol interference of the signal and prevent performance deterioration due to reduction in signal strength; and transmitting the preprocessed signal to a receiving apparatus through a predetermined channel.

In the preprocessing of the signal, the signal may be preprocessed using a preprocessing filter maximizing the SSR parameter.

The preprocessing filter may be a filter minimizing the sidelobe strength of the signal to reduce the inter-symbol interference of the signal while maximizing the strength of the signal.

In the preprocessing of the signal, the signal may be preprocessed using a time reversal (TR) filter performing the time reversal of the channel.

In the preprocessing of the signal, the signal may be preprocessed using the time reversal filter applied with a weighted value changing a coefficient of the time reversal filter.

The weighted value applied to the time reversal filter may be a value maximizing a value of the SSR parameter for the channel.

The time reversal filter applied with the weighted value may be generated by representing the time reversal filter applied with any weighted value and the channel by one equivalent channel; generating the SSR parameter from the equivalent channel; calculating the weighted value maximizing the SSR parameter; and applying the calculated weighted value to the time reversal filter.

In the calculating of the weighted value, the weighted value may be calculated using a bisection method calculating a solution within a predetermined error range.

Another exemplary embodiment of the present invention provides an apparatus for transmitting a signal, including: a signal preprocessing unit preprocessing a signal using a signal power to sidelobe power ratio (SSR) parameter defining a signal to sidelobe ratio to minimize an inter-symbol interference and prevent performance deterioration due to reduction in signal strength; and a signal transmitting unit transmitting the preprocessed signal to a receiving apparatus through a predetermined channel.

The signal preprocessing unit may preprocess the signal using a preprocessing filter maximizing the SSR parameter.

The preprocessing filter may be a filter that minimizes the sidelobe strength of the signal to reduce the inter-symbol interference of the signal while maximizing the strength of the signal.

The signal preprocessing unit may preprocess the signal using a time reversal (TR) filter performing the time reversal of the channel.

The signal preprocessing unit may apply a weighted value changing a coefficient of the time reversal filter to the time reversal filter and preprocess the signal using the time reversal filter applied with the weighted value.

The weighted value applied to the time reversal filter may be a value maximizing a value of the SSR parameter for the channel.

The signal preprocessing unit may include: an equivalent channel representation unit representing the time reversal filter applied with any weighted value and the channel by one equivalent channel; an SSR generation unit generating the SSR parameter from the equivalent channel; and a weighted value calculation unit calculating the weighted value maximizing the SSR parameter, and the calculated weighted value may be applied to the time reversal filter.

The weighted value calculation unit may calculate the weighted value using a bisection method calculating a solution within a predetermined error range.

Yet another exemplary embodiment of the present invention provides a method for generating an improved time reversal filter, including: representing a time reversal filter applied with any weighted value and a predetermined channel by one equivalent channel; generating a signal power to sidelobe power ratio (SSR) parameter defining a signal to sidelobe ratio from the equivalent channel; calculating the weighted value maximizing the SSR parameter; and applying the calculated weighted value to the time reversal filter.

In the calculating of the weighted value, the weighted value may be calculated using a bisection method calculating a solution within a predetermined error range.

Still another exemplary embodiment of the present invention provides a receiving apparatus including: a signal receiving unit receiving a preprocessed signal through a predetermined channel using a signal power to sidelobe power ratio (SSR) parameter defining a signal to sidelobe ratio to minimize an inter-symbol interference and prevent performance deterioration due to reduction in signal strength in a transmitting apparatus.

The signal receiving unit may receive the preprocessed signal using a preprocessing filter maximizing the SSR parameter.

The present invention relates to the transmitting method and apparatus for overcoming the receiver performance degradation due to the inter-symbol interference experienced by the user in the indoor wireless communication environment and reducing the complexity of the receiving apparatus. The improved time reversal (ITR) filter is a technology that can maximize the magnitude of the main peak so as to be robust against noises and minimize the magnitude of the sidelobe signal to minimize the inter-symbol interference. The receiving apparatus performs the reception only through the single-tap detection and the transmitting apparatus performs all the preprocessings, such that the complexity of the receiving apparatus can be reduced, the receiving apparatus can be easily carried and the lifespan of the battery can be extended.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
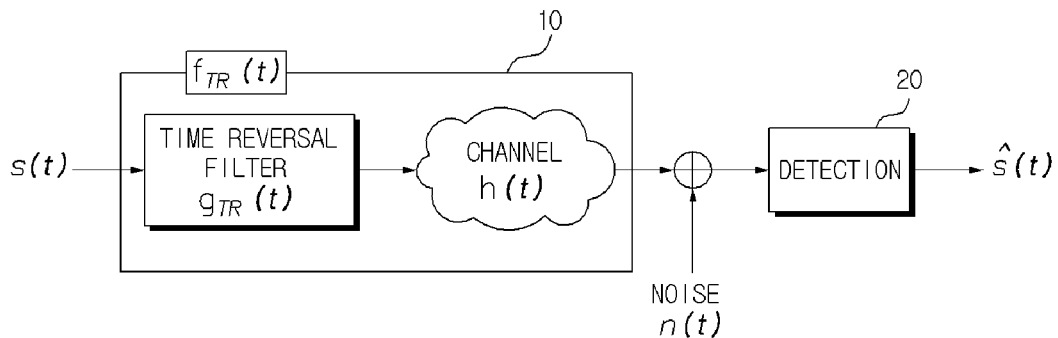
FIG. 1 is a diagram illustrating a transmitting and receiving method through a channel having frequency selective characteristics suitable for an indoor environment according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The following contents illustrate only a principle of the present invention. Therefore, although not clearly described or illustrated in the present specification, those skilled in the art may implement the principle of the invention and invent various apparatuses included in the concept and scope of the invention. All the conditional terms and embodiments described in the present specification are in principle used only to understand the concept of the present invention, and therefore need to be construed as not being limited to particularly described embodiments and states.

The foregoing purposes, features, and advantages will be more apparent based on the following detailed description with reference to the accompanying drawings, and therefore a person with ordinary skill in the art to which the present invention pertains can easily practice the technical idea of the present invention. In describing the present invention, when a detailed description of well-known technology relating to the present invention may unnecessarily make unclear the spirit of the present invention, a detailed description thereof will be omitted. Hereinafter, exemplary embodiments of the present invention will be described in detail with reference to the accompanying drawings.

Referring to FIG. 1, FIG. 1 illustrates a transmitting and receiving method through a channel having frequency selective characteristics suitable for an indoor environment according to the related art.

A time reversal (TR) method for concentrating signals on a spatial axis in a multimedia communication system in an indoor environment can minimize interference signals transmitted to other users that are not targeted and a time reversal method for concentrating signals on a temporal axis can reduce a delay spread of a channel to reduce ISI. In particular, the time reversal method for concentrating signals on the spatial axis is a method for reducing multi user interference (MUI) in a multi user environment, which may be very usefully used. However, even when a transmitting signal to noise ratio is very high, the time reversal method cannot completely remove the MUI occurring on the spatial axis and the ISI occurring on the temporal axis, thereby causing the performance degradation.

When a signal to noise ratio is very high, a ZF technique makes the inter-symbol interference into 0 so as to have greatly improved performance. However, since the ZF technique is a filter to reduce the interference, a magnitude in a main peak of a received signal is relatively very small. Therefore, when the filter is exposed to actually used environmental noises, performance may deteriorate.

A technique proposed to overcome the disadvantage of the ZF technique and the disadvantage of the time reversal technique is a joint ZF-TR technique. The joint ZF-TR technique is a filter that sets the interference to be 0 and maximizes the signal to noise ratio.

However, referring to solutions actually obtained by the joint ZF-TR technique, the joint ZF-TR technique shows a main peak value higher than that of the ZF technique, but shows a main peak value lower than that of the time reversal technique that maximizes the signal to noise ratio and the performance thereof may deteriorate under the condition in which environment is poor.

Therefore, a method and an apparatus for transmitting a signal that maximize a signal to inter-symbol interference ratio while minimizing inter-symbol interference according to the exemplary embodiment of the present invention will be described with reference to FIGS. 2 to 6.

Figure 2:
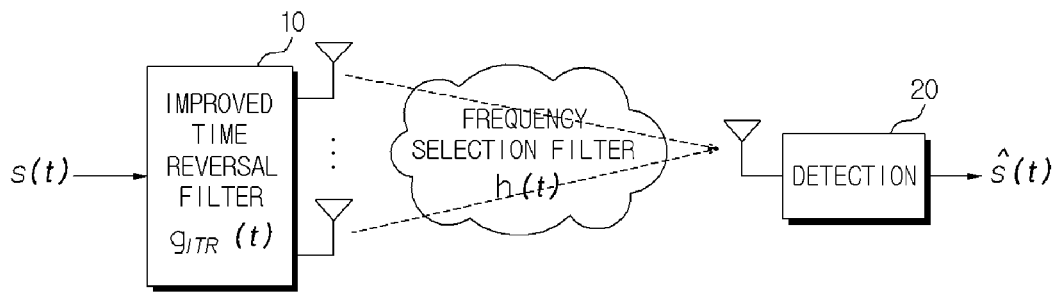
FIG. 2 is a diagram illustrating a system to which a method for transmitting a signal according to an exemplary embodiment of the present invention is applied.

FIG. 2 illustrates a system to which a method for transmitting a signal according to an exemplary embodiment of the present invention is applied. Referring to FIG. 2, a transmitting apparatus 10 uses multiple antennas and a user uses a single antenna. In case of using the system, the complexity of a receiving apparatus 20 is reduced, such that a user may easily carry the receiving apparatus 20 and the lifespan of a battery of the receiving apparatus 20 may extend. Since the indoor environment is assumed, the channel has the frequency selective characteristics, such that the delayed transmitting signal may enter the received signal.

Therefore, a received signal y (t) of time t may be represented as follows.

$$y(t)=h(z)x(t)+n(t), t=0,\pm1,\pm2 \ldots \quad \text{[Equation 1]}$$

In the above Equation 1, $$h(z) = \sum_{k=0}^{L-1} h_k z^{-k}$$

means a finite impulse response (FIR) transfer function (Z-transform) of a channel as a 1×M vector in which the number of channel taps is L. The user uses a single antenna and the number of antennas of the transmitting apparatus 10 is M, which is represented by the 1*M vector.

n (t) is a noise experienced by the receiving apparatus 20 and depends on a Gaussian distribution, and an average is 0 and a dispersion is σ2.

x(t) is represented as follows as a signal obtained by allowing the transmitting apparatus to preprocess a signal s(t) to be transmitted based on improved time reversal (ITR) according to the exemplary embodiment of the present invention to be described below.

$$x(t)=g_{ITR}(z)s(t), t=0,\pm1,\pm2 \quad \text{[Equation 2]}$$

In the above Equation 2, $$g_{ITR}(z) = \sum_{k=0}^{L-1} f_k z^{-k}$$

is a finite impulse response (FIR) of a preprocessing filter and is a 1*M vector. Like the existing time reversal technique, a length of the filter is L and the inter-symbol interference experienced by the receiving apparatus 20 through the proposed filter is minimized.

An equivalent channel representing the proposed preprocessing filter and the channel by one is represented as follows.

$$f(z) = h(z)g(z) = \sum_{k=0}^{2L-2} f_k z^{-k} \quad \text{[Equation 3]}$$

In the above Equation 3, h (z) means a channel, g (z) means a filter, and f (z) means an equivalent channel representing the preprocessing filter and the channel by one. The equivalent channel is also as follows by arranging the above Equation 3 in a product of a matrix and a vector by applying a Sylvester matrix.

$$f = Hg_{ITR} = \begin{bmatrix} h_0 & 0 & \cdots & 0 \\ h_1 & h_0 & & \\ \vdots & h_1 & \ddots & 0 \\ h_{L-1} & \vdots & & h_0 \\ 0 & h_{L-1} & & h_1 \\ & & \ddots & \vdots \\ 0 & & & h_{L-1} \end{bmatrix} \begin{bmatrix} g_{ITR,0} \\ g_{ITR,1} \\ \vdots \\ g_{ITR,L-1} \end{bmatrix} \quad \text{[Equation 4]}$$

In the above Equation 4, H represents the channel in a matrix and gITR is a vector representing the filter. Therefore, the received signal may be briefly arranged as follows based on the matrix and the vector.

$$y=fs+n \quad \text{[Equation 5]}$$

In the above Equation 5, y is a vector formed by accumulating the received signals of Equation 1 as much as 2L−1 time and n is a vector formed by accumulating noises as much as 2L−1 time.

Figure 3:
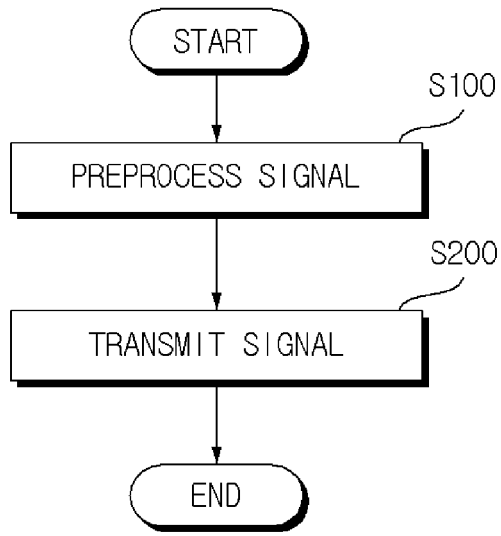
FIG. 3 is a flow chart illustrating a method for transmitting a signal according to the exemplary embodiment of the present invention.

Hereinafter, a method for transmitting a signal according to the detailed exemplary embodiment of the present invention in a signal transmitting system described with reference to FIG. 3 will be described. The method for transmitting a signal according to the exemplary embodiment of the present invention is performed by the transmitting apparatus and includes preprocessing a signal (S100) and transmitting a signal (S200).

The preprocessing of the signal (S100) preprocesses the signal based on a signal power to sidelobe power ratio (SSR)

parameter defining a signal to sidelobe ratio so as to minimize the inter-symbol interference and prevent the performance degradation due to the reduction in signal strength.

The existing time reversal technique is a technique that minimizes the inter-symbol interference to increase the received SNR. However, the inter-symbol interference still exists, such that it is difficult to improve performance in the high SNR. Therefore, in the exemplary embodiment of the present invention, as a parameter for evaluating performance based on the signal to interference ratio under the environment in which the inter-symbol interference exists, a signal power to sidelobe power ratio (SSR) is used. In the case of using the existing time reversal technique, an equivalent channel is formed as the following Equation 6.

$$f_{TR} = Hg_{TR} = \frac{1}{\|h_{TR}\|} \begin{bmatrix} h_0 & 0 & \cdots & 0 \\ h_1 & h_0 & & \\ \vdots & h_1 & \ddots & 0 \\ h_{L-1} & \vdots & & h_0 \\ 0 & h_{L-1} & & h_1 \\ & & \ddots & \vdots \\ 0 & & & h_{L-1} \end{bmatrix}$$ [Equation 6]

$$\begin{bmatrix} h_{L-1}^H \\ h_{L-2}^H \\ \vdots \\ h_0^H \end{bmatrix} = \begin{bmatrix} h_0 h_{L-1}^H \\ h_1 h_{L-1}^H + h_0 h_{L-2}^H \\ \vdots \\ h_{L-2} h_{L-1}^H + h_{L-3} h_{L-2}^H + \ldots + h_0 h_1^H \\ h_{L-1} h_{L-1}^H + h_{L-2} h_{L-2}^H + \ldots + h_0 h_0^H \\ h_{L-1} h_{L-2}^H + h_{L-2} h_{L-3}^H + \ldots + h_1 h_0^H \\ \vdots \\ h_{L-1}^H h_1^H + h_{L-2} h_0^H \\ h_{L-1} h_0 \end{bmatrix}$$

$$g_{TR} = \frac{1}{\|h_{TR}\|}, \ h_{TR} = [h_{L-1}, \ldots, h_1, h_0]^H$$

is used in the above Equation 6 and $h_{L-1}h_{L-1}^H + h_{L-2}h_{L-2}^H + \ldots + h_0 h_0^H$ that is the central element of the right side in the above Equation 6 becomes a main peak and the remaining elements become a sidelobe. Therefore, when using the above Equation 6, the SSR of the existing time reversal technique is as follows.

$$SSR_{TR} = \frac{|h_{TR}^H g_{TR}|^2}{g_{TR}^H \tilde{H}^H \tilde{H} g_{TR}}$$ [Equation 7]

In the exemplary embodiment of the present invention, in order to obtain the power of the sidelobe signal other than the main peak, a middle column in a circulant matrix is made into 0, and thus a new matrix is defined as the following Equation 8.

$$\tilde{H} = \begin{bmatrix} h_0 & 0 & & & \\ h_1 & h_0 & & & \\ h_2 & h_1 & h_0 & & \\ \vdots & \vdots & \vdots & \ddots & \\ h_{L-2} & h_{L-3} & h_{L-4} & & \\ 0 & 0 & 0 & \cdots & 0 \\ 0 & h_{L-1} & h_{L-2} & & h_1 \\ & 0 & h_{L-1} & & h_2 \\ & & 0 & \ddots & \vdots \\ & & & 0 & h_{L-1} \end{bmatrix}$$ [Equation 8]

The filter used in the time reversal technique is a technique that simply performs the time reversal of the channel to allow a transmitting apparatus to use a matching filter, but the present invention uses a preprocessing filter maximizing an SSR parameter to preprocess the signal, thereby maximizing the signal strength and minimizing the sidelobe strength of the signal to reduce the inter-symbol interference of the signal.

Therefore, the present invention relates to a preprocessing filter that maximizes the SSR to maximize the power of the main peak while minimizing the interference and in the exemplary embodiment of the present invention, the preprocessing filter using the time reversal filter applies a weighted value changing a coefficient of the time reversal filter to the time reversal filter and uses the time reversal filter applied with the weighted value to preprocess the signal.

That is, the performance is improved by finding out an optimal weighted value matrix changing the coefficient of the existing time reversal filter. Hereinafter, a method for generating a time reversal filter applied with the weighted value used to preprocess the signal according to the exemplary embodiment of the present invention will be described with reference to FIG. 4.

Figure 4:
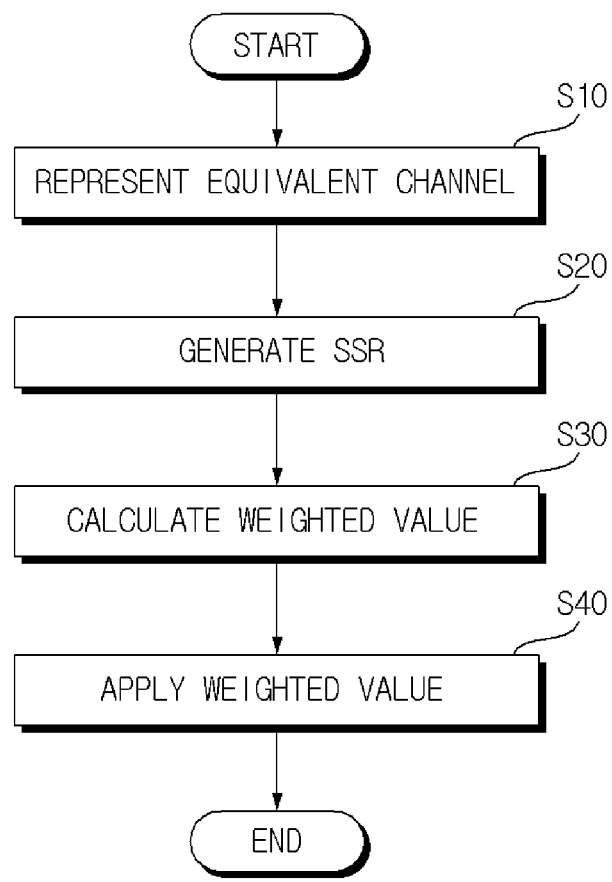
FIG. 4 is a flow chart illustrating a method for generating a time reversal filter using weights used for preprocessing a signal according to the exemplary embodiment of the present invention.

Referring to FIG. 4, the preprocessing filter used in the preprocessing of the signal (S100) according to the exemplary embodiment of the present invention is generated including representing an equivalent channel (S10), generating an SSR (S20), and calculating a weighted value (S30).

In the exemplary embodiment of the present invention, the preprocessing filter may be generated at the time of transmitting the signal, preferably, prior to transmitting the signal.

The representing of the equivalent channel (S10) represents the time reversal filter applied with any weighted value and the channel as the equivalent channel. In the exemplary embodiment of the present invention, a total length of the filter to which both of the number of transmitting antennas and the length of the channel are reflected is ML. Therefore, in order to find out the optimal filter coefficient while keeping the length of the existing filter, the equivalent channel of the transmission method according to the exemplary embodiment of the present invention applied with a weight matrix W as a diagonal matrix of which the size is ML*ML (real number) as a weighted value may be represented by the following Equation 9.

$$f_{ITR} = HWh_{TR} = H \begin{bmatrix} w_1 & & & \\ & w_2 & & \\ & & \ddots & \\ & & & w_{ML} \end{bmatrix} \begin{bmatrix} h_{L-1}^H \\ h_{L-2}^H \\ \vdots \\ h_0^H \end{bmatrix}$$ [Equation 9]

The generating of the SSR (S20), which is a step of defining the SSR parameter from the equivalent channel, mathematically arranges the SSR parameter including the weighted value. Therefore, when the preprocessing filter according to the exemplary embodiment of the present invention is applied, the SSR may be arranged depending on the following Equation 10.

$$SSR_{ITR} = \frac{h_{TR}^H W h_{TR} h_{TR}^H W^H h_{TR}}{h_{TR}^H W^H \tilde{H}^H \tilde{H} W h_{TR}} \quad \text{[Equation 10]}$$

The calculating of the weighted value (S30) is a step of calculating a weighted value maximizing the SSR parameter and in order to make the signal of the transmitting apparatus robust against noise and interference, the power of the main peak needs to be maximized and in order to reduce the inter-symbol interference, the power of the sidelobe signal needs to be minimized. Therefore, when making the above Equation 10 maximize, the filter considering both of both the power of the main peak and the power of the sidelobe signal may be designed, which is represented by the following Equation 11.

$$\underset{w}{\text{MAXIMIZE}} \frac{h_{TR}^H W h_{TR} h_{TR}^H W^H h_{TR}}{h_{TR}^H W^H \tilde{H}^H \tilde{H} W h_{TR}} \quad \text{[Equation 11]}$$

such that $h_{TR}^H W^H W h_{TR} = 1$

In the above Equation 11, setting the transmitting power to be 1 means using the same power as the existing technique as described above. Hereinafter, in the exemplary embodiment of the present invention, a mathematical process for deriving the optimal preprocessing filter will be described.

First, in order to find out a weighting matrix depending on the above Equation 11, a modification of an objective equation and a conditional equation is required. The reason is to easily derive a solution by modifying the weighting matrix into a vector type and making a problem into a quadratic form. First, the modification of the equivalent channel depends on the following Equation 12.

$$f_d = H \begin{bmatrix} w_1 & & & \\ & w_2 & & \\ & & \ddots & \\ & & & w_{ML} \end{bmatrix} \begin{bmatrix} h_{L-1}^H \\ h_{L-2}^H \\ \vdots \\ h_0^H \end{bmatrix} = \quad \text{[Equation 12]}$$

$$H \text{diag}\left(\begin{bmatrix} h_{L-1}^H \\ h_{L-2}^H \\ \vdots \\ h_0^H \end{bmatrix} \begin{bmatrix} w_1 \\ w_2 \\ \vdots \\ w_{ML} \end{bmatrix}\right) = HD_{TR} W$$

Converting hTR corresponding to the existing time reversal filter into the diagonal matrix and converting the weighting matrix into the vector form is arranged depending on Equation 12. The SSR of the above Equation 10 may be converted into a fractional quadratic form, depending on the above Equation 12.

$$SSR_{ITR} = \frac{h_{TR}^H W h_{TR} h_{TR}^H W^H h_{TR}}{h_{TR}^H W^H \tilde{H}^H \tilde{H} W h_{TR}} = \frac{w^H Q_1 w}{w^H Q_2 w} \quad \text{[Equation 13]}$$

In the above Equation 13, $Q_1 = D_{TR}^H h_{TR} h_{TR}^H D_{TR}$ is a symmetric matrix having a positive semidefinite and $Q_2 = D_{TR}^H \tilde{H}^H \tilde{H} D_{TR}$ is a hermitian matrix having a positive definite. The conditional Equation may also be changed into the quadratic form, depending on the following Equation 14.

$$w^H D_{TR}^H D_{TR} w = w^H Q_3 w = 1 \quad \text{[Equation 14]}$$

In the above Equation 14, $Q_3 = D_{TR}^H D_{TR}$ is a diagonal matrix that is formed of real numbers having the positive definite. The optimization problem obtaining the optimal weighting matrix using Equations 13 and 14 is arranged as follows.

$$\underset{w \in \Theta}{\text{MAXIMIZE}} \frac{w^H Q_1 w}{w^H Q_2 w} \quad \text{[Equation 15]}$$

where $\Theta = w \in R^{LM}; w^H Q_3 w = 1$

However, the problem has the objective equation having the fractional quadratic form, and therefore it is difficult to find out an optimal solution using a non-convex problem. Therefore, there is a need to design the optimal filter by changing the optimization problem into the form of the convex problem that finds out one variable by slightly modifying the optimization problem and deriving a solution using a bisection method. The solution obtained depending on the above Equation 15 is a ϵ-optimal solution having characteristics like the following Equation 16.

$$\frac{w^{*H} Q_1 w^*}{w^{*H} Q_2 w^*} + \varepsilon \leq \underset{w \in \Theta}{\max} \frac{w^H Q_1 w}{w^H Q_2 w} \quad \text{[Equation 16]}$$

That is, as the ϵ value is set to be small, results approximating the optimal solution may be obtained.

A method for deriving a solution for solving a problem of maximizing the performance of the existing system set in order to design the optimal filter according to the exemplary embodiment of the present invention will be described.

First, two observations may be obtained based on the objective equation in the above Equation 15.

$$\underset{w \in \Theta}{\max} \frac{w^H Q_1 w}{w^H Q_2 w} \geq \alpha \quad \text{[Equation 17]}$$

$$\underset{w \in \Theta}{\max} \{w^H Q_1 w - \alpha w^H Q_2 w\} \geq 0$$

For the purpose of finding out the weighting vector maximizing the SSR in the problem, at the time of deriving the optimal solution, the solution always has a larger value than any α. Modifying and arranging the above Equation may obtain a conclusion like the above Equation 17. When the above Equation 15 is modified and arranged into an epigraph form based on the two observations, the optimization problem for one variable may be made.

MAXIMIZE $\alpha$ [Equation 18]

subject to $\frac{w^H Q_1 w}{w^H Q_2 w} - \alpha \geq 0$ $w \in \Theta = \{w: w^H Q_3 w = 1\}$ In the exemplary embodiment of the present invention, in order to solve the optimization problem having the epigraph form, it is preferable to use the bisection method that calculates the solution within the predetermined error range. In the exemplary embodiment of the present invention, a schematic algorithm of the bisection method is configured as follows.

TABLE 1

1. Initial step: Set $lb_0 = m$, $ub_0 = M$
2. General step: For every $$\alpha_k = \frac{lb_{k-1} + ub_{k-1}}{2}$$

(1) Define $$\beta_k = \max_{w \in \Theta} \{w^H Q_1 w - \alpha w^H Q_2 w\} \quad (*)$$

(2) Calculate
   (a) $\beta_k \leq 0 \rightarrow lb_k = lb_{k-1}$, $ub_k = \alpha_k$
   (b) $\beta_k > 0 \rightarrow lb_k = \alpha_k$, $ub_k = ub_{k-1}$
3. Stopping rule: $ub_{k^*} - lb_{k^*} \leq \epsilon$
4. Output $w^* \in \underset{w \in \Theta}{\operatorname{argmax}}\{w^H Q_1 w - lb_{k^*} w^H Q_2 w\}$ When the above algorithm is repeatedly performed, an algorithm ends while setting a section smaller than the $\epsilon$ value set by the present inventors. Therefore, the accuracy of the solution derived may be defined depending on the $\epsilon$ value.

In order to perform the above schematic algorithm, a sub-problem (*) of step 2 needs to be solved. The optimization problem is again defined as follows.

$$\max_w \{w^H Q_1 w - \alpha w^H Q_2 w\} \qquad \text{[Equation 19]}$$

subject to $w \in \Theta = \{w: w^H Q_3 w = 1\}$

This problem is also a non-convex problem, and therefore it is difficult to obtain the solution thereof. However, the problem is solved by substituting a variable as follows so as to modify the conditional equation into a Euclidean norm form.

$$s = Q_3^{1/2} w \qquad \text{[Equation 20]}$$

Therefore, the conditional equation is arranged as follows.

$$\Theta = \{s : \|s\|^2 = 1\} \qquad \text{[Equation 21]}$$

The objective equation is arranged as follows, and thus is changed into the convex form.

$$w^H Q_1 w - \alpha w^H Q_2 w = \qquad \text{[Equation 22]}$$
$$s^H (Q_3^{-1/2})^H (Q_1) Q_3^{-1/2} s - \alpha s^H (Q_3^{-1/2})^H Q_2 Q_3^{-1/2} s =$$
$$s^H [(Q_3^{-1/2})^H (Q_1 - \alpha Q_2) Q_3^{-1/2}] s = s^H \tilde{Q} s$$

The above Equation 19 is arranged as the optimization problem having the convex form based on the above Equations 21 and 22 and the solution thereof becomes the optimal solution in the overall region.

$$\max_{\|s\|^2=1} s^H \tilde{Q} s \qquad \text{[Equation 23]}$$

The above Equation 23 may derive the solution based on a Lagrangian method. A Lagrangian function for solving the problem is as follows.

$$l(s,\lambda) = s^H \tilde{Q} s + \lambda(1 - s^H s) \qquad \text{[Equation 24]}$$

Therefore, a Lagrangian condition is as follows.

$$D_s l(s,\lambda) = 2s^H \tilde{Q} + 2\lambda s^H = 0^T \qquad \text{[Equation 25]}$$

$\lambda$ obtained based on the above Equation 25 becomes a maximum eigen value of $\tilde{Q}$ and the derived solution $s^o$ becomes an eigen vector corresponding to the maximum eigen value.

Next, in the applying of the weighted value (S40), the improved time reversal filter is generated by applying the solution calculated by the foregoing method as the weighted value. Therefore, in the exemplary embodiment of the present invention, in the preprocessing of the signal (S100), the signal is preprocessed based on the finally generated improved time reversal filter and the preprocessed signal has the maximum SSR value.

Figure 5:
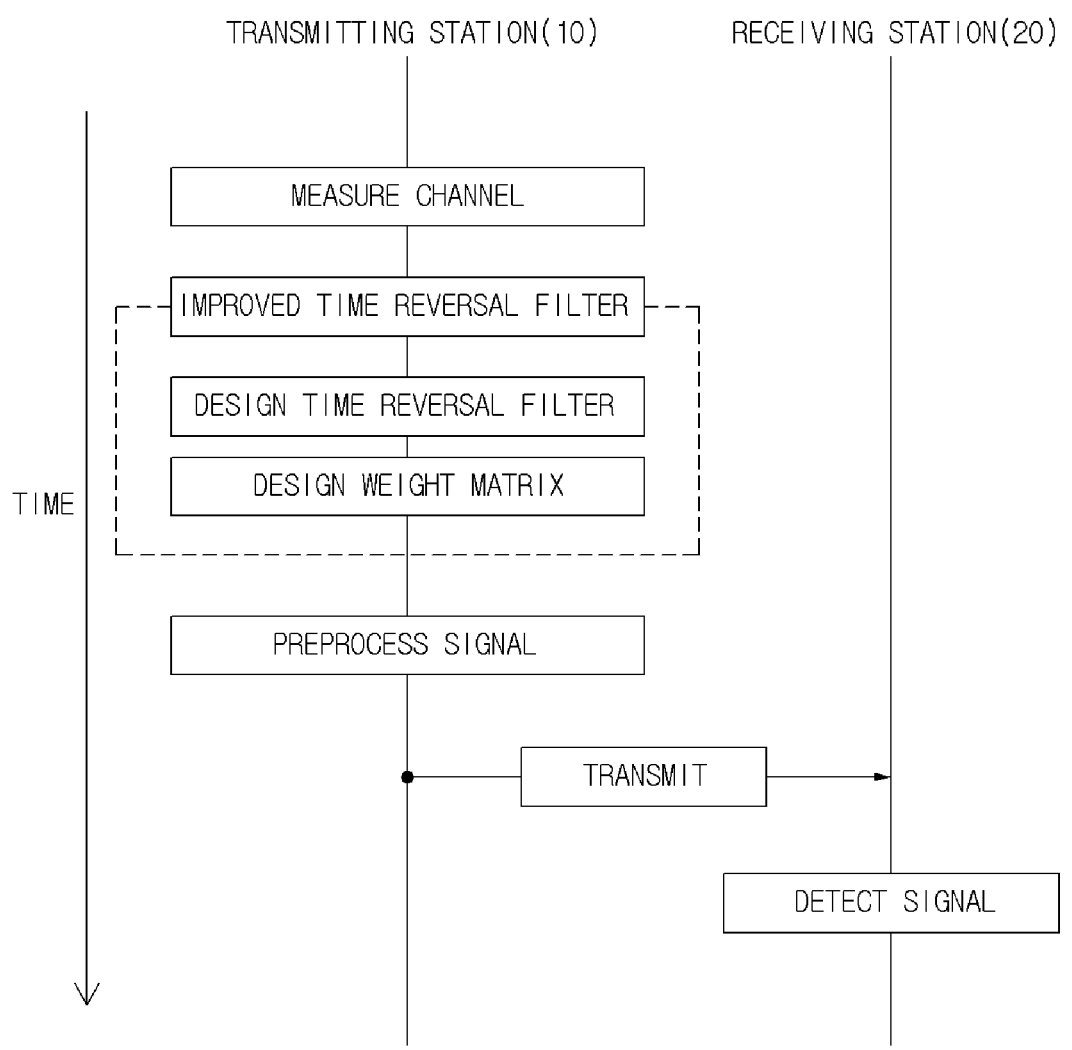
FIG. 5 is a diagram illustrating a signal transmitting process to which the method for transmitting a signal according to the exemplary embodiment of the present invention is applied over time.

When the signal transmitting process to which the method for transmitting a signal according to the exemplary embodiment of the present invention is applied is represented over time with reference to FIG. 5, the transmitting apparatus 10 measures a channel based on a reference signal received from the receiving apparatus 20 and the time reversal filter improved by applying the weighting matrix to the existing time reversal filter by the method for generating the foregoing improved time reversal filter is designed.

Next, the transmitting apparatus 10 preprocesses the signal using the designed improved time reversal filter and transmits the preprocessed signal to the receiving apparatus 20 and the receiving apparatus 20 detects the signal.

Hereinafter, the apparatus 10 for transmitting a signal performing the method for transmitting a signal according to the exemplary embodiment of the present invention will be described with reference to FIG. 5.

Figure 6:
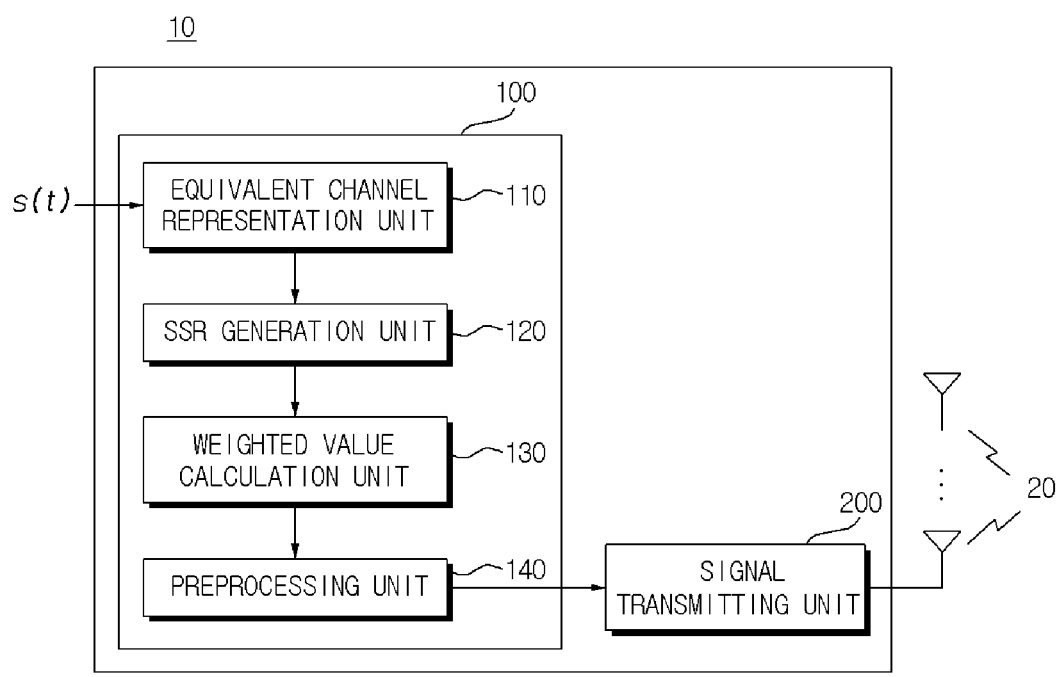
FIG. 6 is a block diagram illustrating an apparatus for transmitting a signal according to the exemplary embodiment of the present invention.

Referring to FIG. 6, the apparatus for transmitting a signal according to the exemplary embodiment of the present invention includes a signal preprocessing unit 100 and a signal transmitting unit 200.

The signal preprocessing unit 100 performs the preprocessing of the signal as described above (S100), such that the inter-symbol interference of the signal to be transmitted is minimized and in order to prevent the performance from deteriorating due to the reduction in the signal strength, the signal is preprocessed using the signal power to sidelobe power ration (SSR) parameters that define a signal to sidelobe ratio.

The signal preprocessing unit 100 includes an equivalent channel representation unit 110 that represents the time reversal filter applied with any weighted value and the channel by the equivalent channel, an SSR generation unit 120 that generates the SSR parameter from the equivalent channel, and a weighted value calculation unit 130 that calculates the weighted value maximizing the SSR parameter.

The preprocessing unit 140 generates the improved time reversal filter by applying the weighted value calculated by the weighted value calculation unit 130 to the time reversal filter. That is, in the exemplary embodiment of the present invention, the signal preprocessing unit 100 uses the generated improved time reversal filter to preprocess the signal.

The signal transmitting unit 200 performs the transmitting of the signal (S200) and transmits the preprocessed signal to the receiving apparatus 20 through the predetermined channel. Therefore, the receiving apparatus 20 of the transmitting and receiving system to which the method for transmitting a signal according to the exemplary embodiment of the present invention is applied receives the signal preprocessed by the transmitting apparatus.

Meanwhile, the method for generating the improved time reversal preprocessing filter according to the exemplary embodiment of the present invention can be implemented as computer-readable codes in a computer-readable recording medium. The computer-readable recording medium may include all kinds of recording devices in which data that may be read by a computer system are stored.

The example of the computer-readable recording medium may include a ROM, a RAM, a CD-ROM, a magnetic tape, a floppy disk, an optical data storage device, and the like. The computer-readable recording medium is distributed in computer systems connected by a network, and thus the computer-readable codes may be stored and executed by a distribution method. Functional programs, codes, and code segments for implementing the exemplary embodiment of the present invention may be easily inferred by programmers in the art to which the present invention pertains.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method for transmitting a signal, comprising:
preprocessing a signal to be transmitted using a time reversal (TR) filter applied with a weighted value to reduce an inter-symbol interference of the signal and relieve performance deterioration due to reduction in signal strength, wherein the weighted value is calculated using a signal power to sidelobe power ratio (SSR) parameter defining a signal to sidelobe ratio, and wherein the SSR parameter is generated by the TR filter applied with the weighted value and a predetermined channel; and
transmitting the preprocessed signal to a receiving apparatus through a predetermined channel.

2. The method of claim 1, wherein in the preprocessing of the signal, the signal is preprocessed using the TR filter increasing the SSR parameter to a predetermined threshold value or more.

3. The method of claim 2, wherein the TR filter is a filter reducing the sidelobe strength of the signal to reduce the inter-symbol interference of the signal while increasing the strength of the signal.

4. The method of claim 1, wherein in the preprocessing of the signal, the signal is preprocessed using the time reversal (TR) filter performing the time reversal of the channel.

5. The method of claim 4, wherein in the preprocessing of the signal, the signal is preprocessed using the time reversal filter applied with the weighted value changing a coefficient of the time reversal filter.

6. The method of claim 5, wherein the weighted value applied to the time reversal filter is a value maximizing a value of the SSR parameter for the channel.

7. The method of claim 6, wherein the time reversal filter applied with the weighted value is generated by:
representing the time reversal filter applied with any weighted value and the channel by one equivalent channel;
generating the SSR parameter from the equivalent channel;
calculating the weighted value maximizing the SSR parameter; and
applying the calculated weighted value to the time reversal filter.

8. The method of claim 7, wherein in the calculating of the weighted value, the weighted value is calculated using a bisection method calculating a solution within a predetermined error range.

9. An apparatus for transmitting a signal, comprising:
a signal preprocessing unit preprocessing a signal using a time reversal (TR) filter applied with a weighted value to minimize an inter-symbol interference and prevent performance deterioration due to reduction in signal strength, wherein the weighted value is calculated using a signal power to sidelobe power ratio (SSR) parameter defining a signal to sidelobe ratio, and wherein the SSR parameter is generated by the TR filter applied with the weighted value and a predetermined channel; and
a signal transmitting unit transmitting the preprocessed signal to a receiving apparatus through a predetermined channel.

10. The apparatus of claim 9, wherein the signal preprocessing unit preprocesses the signal using the TR filter maximizing the SSR parameter.

11. The apparatus of claim 10, wherein the TR filter is a filter that minimizes the sidelobe strength of the signal to reduce the inter-symbol interference of the signal while maximizing the strength of the signal.

12. The apparatus of claim 9, wherein the signal preprocessing unit preprocesses the signal using the time reversal (TR) filter performing the time reversal of the channel.

13. The apparatus of claim 12, wherein the signal preprocessing unit applies the weighted value changing a coefficient of the time reversal filter to the time reversal filter and preprocesses the signal using the time reversal filter applied with the weighted value.

14. The apparatus of claim 13, wherein the weighted value applied to the time reversal filter is a value maximizing a value of the SSR parameter for the channel.

15. The apparatus of claim 13, wherein the signal preprocessing unit includes:
an equivalent channel representation unit representing the time reversal filter applied with any weighted value and the channel by one equivalent channel;
an SSR generation unit generating the SSR parameter from the equivalent channel; and
a weighted value calculation unit calculating the weighted value maximizing the SSR parameter, and
the calculated weighted value is applied to the time reversal filter.

16. The apparatus of claim 15, wherein the weighted value calculation unit calculates the weighted value using a bisection method calculating a solution within a predetermined error range.

17. A method for generating an improved time reversal filter, comprising:
  representing a time reversal filter applied with any weighted value and a predetermined channel by one equivalent channel;
  generating a signal power to sidelobe power ratio (SSR) parameter defining a signal to sidelobe ratio from the equivalent channel;
  calculating the weighted value maximizing the SSR parameter; and
  applying the calculated weighted value to the time reversal filter in reduce an inter-symbol interference of the signal and relieve performance deterioration due to reduction in signal strength.

18. The method of claim 17, wherein in the calculating of the weighted value, the weighted value is calculated using a bisection method calculating a solution within a predetermined error range.

19. A receiving apparatus, comprising:
  a signal receiving unit receiving a preprocessed signal through a predetermined channel, wherein the preprocessed signal is preprocessed using a time reversal (TR) filter applied with a weighted value to minimize an inter-symbol interference and prevent performance deterioration due to reduction in signal strength in a transmitting apparatus, wherein the weighted value is calculated using a signal power to sidelobe power ratio (SSR) parameter defining a signal to sidelobe ratio, and wherein the SSR parameter is generated by the TR filter applied with the weighted value and the predetermined channel.

20. The receiving apparatus of claim 19, wherein the signal receiving unit receives the preprocessed signal preprocessed using the TR filter maximizing the SSR parameter.

* * * * *